(12) United States Patent
Nara et al.

(10) Patent No.: US 8,718,423 B2
(45) Date of Patent: May 6, 2014

(54) OPTICAL BRANCHING ELEMENT AND OPTICAL BRANCHING CIRCUIT (71) Applicant: Furukawa Electric Co., Ltd., Tokyo (JP)

(72) Inventors: Kazutaka Nara, Tokyo (JP); Noritaka Matsubara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/964,698

(22) Filed: Aug. 12, 2013

(65) Prior Publication Data
US 2013/0330042 A1 Dec. 12, 2013

Related U.S. Application Data (63) Continuation of application No. PCT/JP2012/074501, filed on Sep. 25, 2012.

(30) Foreign Application Priority Data

Dec. 9, 2011 (JP) .................................. 2011-270156

(51) Int. Cl.
*G02B 6/26* (2006.01)
(52) U.S. Cl.
USPC .................. 385/43; 385/15; 385/31; 385/39; 385/44; 385/45
(58) Field of Classification Search
CPC ........ G02B 6/1228; G02B 6/305; G02B 6/26; G02B 6/262
USPC .............................. 385/15, 31, 39, 43, 44, 45
See application file for complete search history.

(56) References Cited

U.S. PATENT DOCUMENTS

| 5,745,618 | A | 4/1998 | Li | |
| 5,818,989 | A * | 10/1998 | Nakamura | 385/45 |
| 6,934,447 | B2 * | 8/2005 | Kim | 385/45 |
| 7,212,709 | B2 | 5/2007 | Hosoi | |
| 7,840,108 | B2 * | 11/2010 | Miyadera et al. | 385/45 |

FOREIGN PATENT DOCUMENTS

| JP | 3338356 | 8/2002 |
| JP | 2004-325865 | 11/2004 |
| JP | 2006-023623 | 1/2006 |
| JP | 4385224 | 10/2009 |

OTHER PUBLICATIONS

International Search Report issued on Nov. 6, 2012 for PCT/JP2012/074501 filed on Sep. 25, 2012 with English Translation.
International Written Opinion issued on Nov. 6, 2012 for PCT/JP2012/074501 filed on Sep. 25, 2012.
J. Gamet et al.; "Ultralow-Loss 1×8 Splitter Based on Field Matching Photonics Technology Letters"; Sep. 2004; vol. 16, Issue 9; pp. 2060-2062.
M.H.Hu et al.; "A Low-Loss and Compact Waveguide Y-Branch Using Refractive-Index Tapering, Photonics Technology Letters"; Feb. 1997; vol. 9, Issue 2; pp. 203-205.

* cited by examiner

*Primary Examiner* — Jennifer Doan
(74) *Attorney, Agent, or Firm* — Oblon, Spivak, McClelland, Maier & Neustadt, L.L.P.

(57) ABSTRACT

An optical branching element includes: an input waveguide; a tapered waveguide connected to the input waveguide; two branched waveguides that are connected to the tapered waveguide and arranged so as to form a Y-shape with the input waveguide and the tapered waveguide; and a plurality of strip-like waveguides that are provided so as to connect between the two branched waveguides and not to protrude outside the two branched waveguides, and formed so as to decrease in width as becoming distant from the tapered waveguide.

9 Claims, 8 Drawing Sheets

OPTICAL BRANCHING ELEMENT AND OPTICAL BRANCHING CIRCUIT

CROSS-REFERENCE TO RELATED APPLICATIONS

This application is a continuation of PCT International Application No. PCT/JP2012/074501 filed on Sep. 25, 2012, which claims the benefit of priority from the prior Japanese Patent Application No. 2011-270156 filed on Dec. 9, 2011. The entire contents of these applications are incorporated herein by reference.

BACKGROUND OF THE INVENTION

1. Field of the Disclosure

The disclosure relates to an optical branching element and an optical branching circuit that use optical waveguides.

2. Description of the Related Art

Techniques have been disclosed, which reduce loss in conventional optical branching elements using optical waveguides by providing strip-like waveguides to branched waveguides. For example, in Japanese Patent No. 3338356, Japanese Patent No. 4385224, and Japanese Patent Application Laid-open No. 2004-325865, strip-like waveguides are provided in a portion from a slab waveguide to an arrayed waveguide of an arrayed waveguide grating (AWG) to reduce the loss. In Japanese Patent Application Laid-open No. 2006-023623, strip-like waveguides are provided in a portion from a tapered waveguide to a branched waveguide of a Y-branched optical branching element to reduce the loss.

However, when the inventors of the present application fabricated Y-branched optical branching elements having strip-like waveguides and carefully examined their characteristics, there was a problem that a desired loss reduction predicted from their designs was not achieved in some cases.

Accordingly, there is a need to provide an optical branching element and an optical branching circuit that are able to achieve reduction of the loss even further.

SUMMARY OF THE INVENTION

According to an embodiment of the present invention, an optical branching element includes: an input waveguide; a tapered waveguide connected to the input waveguide; two branched waveguides that are connected to the tapered waveguide and arranged so as to form a Y-shape with the input waveguide and the tapered waveguide; and a plurality of strip-like waveguides that are provided so as to connect between the two branched waveguides and not to protrude outside the two branched waveguides, and formed so as to decrease in width as becoming distant from the tapered waveguide.

According to another embodiment of the present invention, an optical branching circuit includes optical branching elements that are cascade-connected, each of which is according to the above embodiment.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE INVENTION

A description will be made below in detail of embodiments of an optical branching element and an optical branching circuit according to the present invention, with reference to the accompanying drawings. The present invention is not limited by the embodiments. Further, in the drawings, the same reference signs are assigned to the same or corresponding elements as appropriate. Furthermore, it is to be noted that the drawings are schematic, and that relations between thicknesses and widths of layers, ratios of the layers, and the like may differ from those of the actual. A portion may be included whose dimensional relations and ratios differ among the drawings.

First Embodiment

Figure 1:
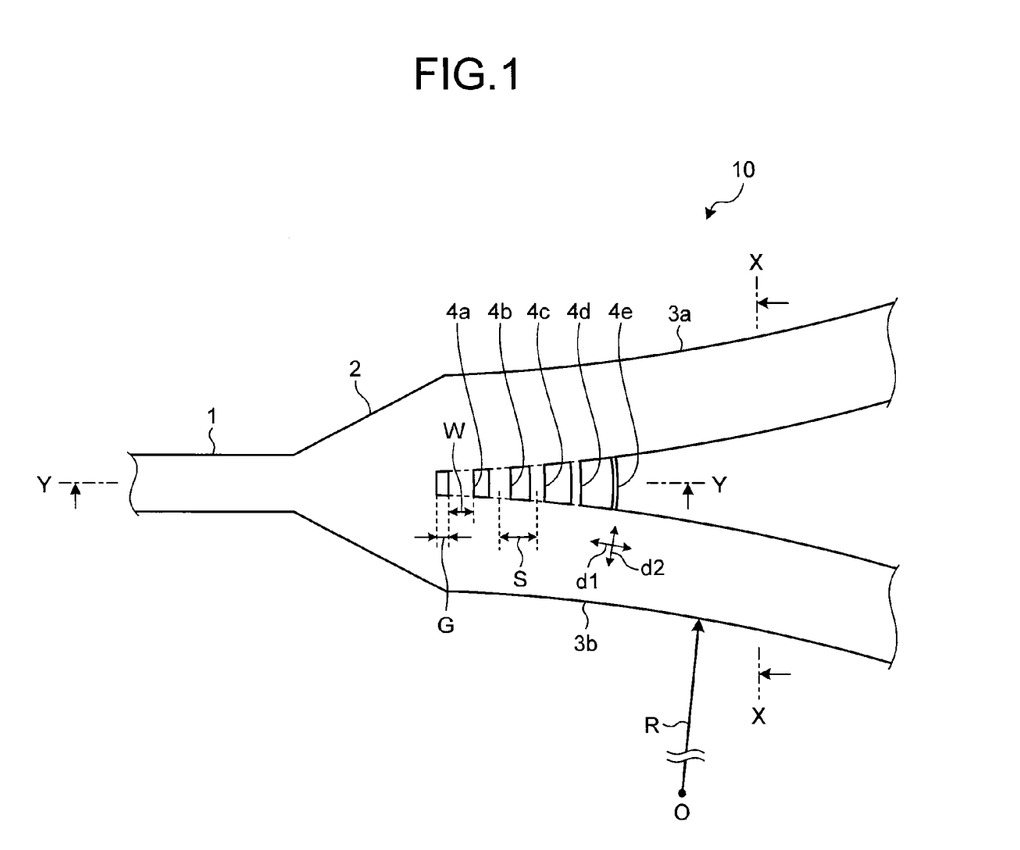
FIG. 1 is a schematic plan view of an optical branching element according to a first embodiment.
Figure 2:
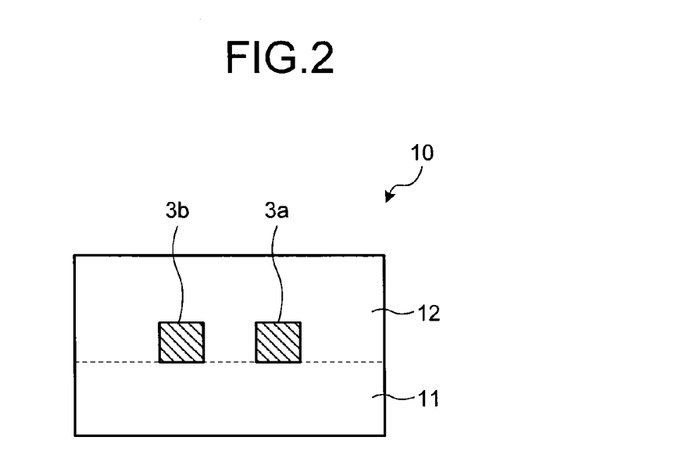
FIG. 2 is an X-X line sectional view of the optical branching element illustrated in FIG. 1.
Figure 3:
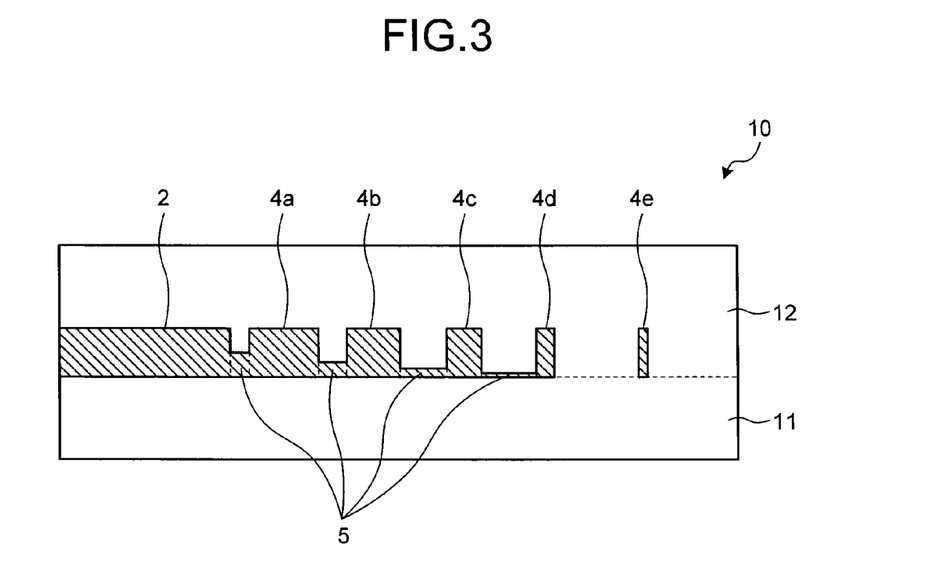
FIG. 3 is a Y-Y line sectional view of the optical branching element illustrated in FIG. 1.

FIG. 1 is a schematic plan view of an optical branching element according to a first embodiment of the present invention. FIG. 2 is an X-X line sectional view of this optical branching element 10 illustrated in FIG. 1. FIG. 3 is a Y-Y line sectional view of the optical branching element 10 illustrated in FIG. 1. As illustrated in FIG. 1, the optical branching element 10 includes an input waveguide 1, a tapered waveguide 2 connected to the input waveguide, two branched waveguides 3a and 3b, five strip-like waveguides 4a to 4e, and a buffer waveguide 5.

The input waveguide 1 is approximately linearly formed, and light having a wavelength of, for example, a 1.31-μm band or 1.55-μm band is input thereto from the left side of the drawing. The tapered waveguide 2 is connected at an optical output end of the input waveguide 1, and formed so as to increase in width along a direction of propagation of the light that has been input to the input waveguide 1. The two branched waveguides 3a and 3b are connected to an optical output end of the tapered waveguide 2, and are composed of curved waveguides. The branched waveguides 3a and 3b are arranged so as to form a Y-shape with the input waveguide 1 and the tapered waveguide 2. Accordingly, the optical branching element 10 is formed as a Y-branched element.

As illustrated in FIG. 2, the branched waveguides 3a and 3b are formed on a quartz substrate 11, and are formed so that their top portions and lateral portions are surrounded by an upper cladding layer 12. The input waveguide 1 and the tapered waveguide 2 are also formed on the quartz substrate 11, and are formed so that their top portions and lateral portions are surrounded by the upper cladding layer 12. The quartz substrate 11 and the upper cladding layer 12 are made of silica-based glass such as pure quartz glass or the like. The input waveguide 1, the tapered waveguide 2, and the branched waveguides 3a and 3b are made of silica-based glass with titanium (Ti), germanium (Ge), or the like added to have an increased refractive index so that their relative refractive index differences with respect to the quartz substrate 11 and the upper cladding layer 12 become 0.4%. The cross sections of the input waveguide 1 and the branched waveguides 3a and 3b each have a size of 7 μm×7 μm. Accordingly, the input waveguide 1 and the branched waveguides 3a and 3b are able to propagate the input light of the wavelength of the 1.31-μm band or 1.55-μm band in a single mode. A curvature radius R of the branched waveguides 3a and 3b with respect to the center O of a circular arc formed by the branched waveguides 3a and 3b is set to a curvature radius by which a bending loss with respect to the input light does not become a problem. For example, if the relative refractive-index differences and the size of the cross sections of the branched waveguides 3a and 3b have the above values, the curvature radius may be set to 15000 μm.

The tapered waveguide 2 is sized such that its thickness is, for example, 7 μm like the input waveguide 1, and its width is formed so as to widen, for example, from 7 μm to 14 μm.

Next, the strip-like waveguides 4a to 4e and the buffer waveguide 5 will be described. As illustrated in FIGS. 1 and 3, the strip-like waveguides 4a to 4e are composed of curved waveguides, and are provided so as to connect between the branched waveguides 3a and 3b and so as not to protrude outside the branched waveguides 3a and 3b.

The buffer waveguide 5 is provided so as to fill in between the strip-like waveguides 4a to 4d, and is formed so that its height decreases as becoming distant from the tapered waveguide 2. The strip-like waveguides 4a to 4e and the buffer waveguide 5 are also formed on the quartz substrate 11, and are formed so that their top portions and lateral portions are surrounded by the upper cladding layer 12. Further, the strip-like waveguides 4a to 4e and the buffer waveguide 5 are made of silica-based glass with Ti, Ge, or the like added to have an increased refractive index so that their relative refractive-index differences with respect to the quartz substrate 11 and the upper cladding layer 12 become 0.4%.

The strip-like waveguides 4a to 4e will be further described. The tapered waveguide 2 is separated by a gap G from the strip-like waveguide 4a, which is the nearest to the tapered waveguide 2. The gap G is, for example, 1.5 μm. A width of the strip-like waveguide 4a, which is the nearest to the tapered waveguide 2, is hereinafter referred to as a first width W. Further, the strip-like waveguides 4a to 4e are provided so as to be separated from each other by a predetermined interval (step S), which is, for example, 22 μm, and are formed so that their widths descend as their distances from the tapered waveguide 2 ascends. For example, if the first width W of the strip-like waveguide 4a is 14 μm, the widths of the strip-like waveguides 4b, 4c, 4d, and 4e are approximately 10.6 μm, 7.2 μm, 3.8 μm, and 0.5 μm, respectively, and they are formed such that their widths descend approximately linearly. A height of the buffer waveguide 5 between the tapered waveguide 2 and the strip-like waveguide 4a is 3.5 μm, and therefore, the gap between the tapered waveguide 2 and the strip-like waveguide 4a has a depth of 3.5 μm. Further, the depths of gaps are 4.8 μm, 6.0 μm, and 6.5 μm between the strip-like waveguides 4a and 4b, between the strip-like waveguides 4b and 4c, and between the strip-like waveguides 4c and 4d, respectively.

Each of the branched waveguides 3a and 3b is perpendicular to each of the strip-like waveguides 4a to 4e. Here, for example, the branched waveguide 3b being perpendicular to the strip-like waveguide 4e means that a direction d1 of a tangential line of the circular arc formed by the branched waveguide 3b and a direction d2 of a tangential line of a circular arc formed by the strip-like waveguide 4e cross each other at right angles at their mutually connected portions.

The optical branching element 10 may be fabricated, for example, by using a silica-based planar lightwave circuit (PLC) fabrication process described below. First, by a flame hydrolysis deposition (FHD) method, a silica-based glass layer with Ti or Ge added for forming each optical waveguide is deposited on the quartz substrate 11 and transparently vitrified. Next, using a photomask with a pattern of optical waveguides to be formed drawn thereon, by photolithography using reactive ion etching or a reactive ion etching method, a silica-based glass layer is processed so as to be formed into the pattern of each optical waveguide. The buffer waveguide 5 having different heights may be formed by adjusting conditions of the reactive ion etching or the photolithography.

Thereafter, by the FHD method again, silica-based glass for forming the upper cladding layer 12 is deposited and transparently vitrified to form the upper cladding layer 12. Thereby, the optical branching element 10 is able to be manufactured.

When light is input from the input waveguide 1 of the optical branching element 10, the input waveguide 1 waveguides the light in a single mode and inputs the light to the tapered waveguide 2. The tapered waveguide 2 performs mode conversion to cause the input light to be input to the branched waveguides 3a and 3b in a single mode. Each of the branched waveguides 3a and 3b waveguides the mode-converted light in a single mode.

Thereupon, the strip-like waveguides 4a to 4e have an effect of suppressing a part of the light from failing to be sufficiently coupled between the tapered waveguide 2 and the branched waveguides 3a and 3b and leaking as radiation mode light, and an effect of increasing a coupling efficiency. As a result, optical loss of the optical branching element 10 is reduced. In addition, because the strip-like waveguides 4a to 4e are formed so that the widths thereof descend as their distances from the tapered waveguide 2 increase, the mode conversion from the tapered waveguide 2 to the branched waveguides 3a and 3b is smoothly performed, and the optical loss is further reduced. Moreover, because the buffer waveguide 5 is formed so as to decrease in height as its distance from the tapered waveguide 2 increases, the strip-like waveguides 4a to 4e are not completely discretized.

Therefore, the mode conversion is performed further smoothly, and thus the optical loss is reduced even further.

Furthermore, because each of the branched waveguides 3a and 3b is perpendicular to each of the strip-like waveguides 4a to 4e, optical loss due to crosstalk at their mutually connected portions are suppressible.

Furthermore, because the tapered waveguide 2 is separated by the gap G from the strip-like waveguide 4a, the branched waveguides 3a and 3b are able to be caused to fall against each other near the tapered waveguide 2 in the process for forming the upper cladding layer 12. Thereby, the interval between the branched waveguides 3a and 3b are able to be narrowed, and therefore, the light output from the tapered waveguide 2 is able to be coupled to the branched waveguides 3a and 3b more efficiently.

Here, in the optical branching element 10, the strip-like waveguides 4a to 4e are provided so as not to protrude outside the branched waveguides 3a and 3b. Thereby, the optical loss is further reduced.

Figure 13:
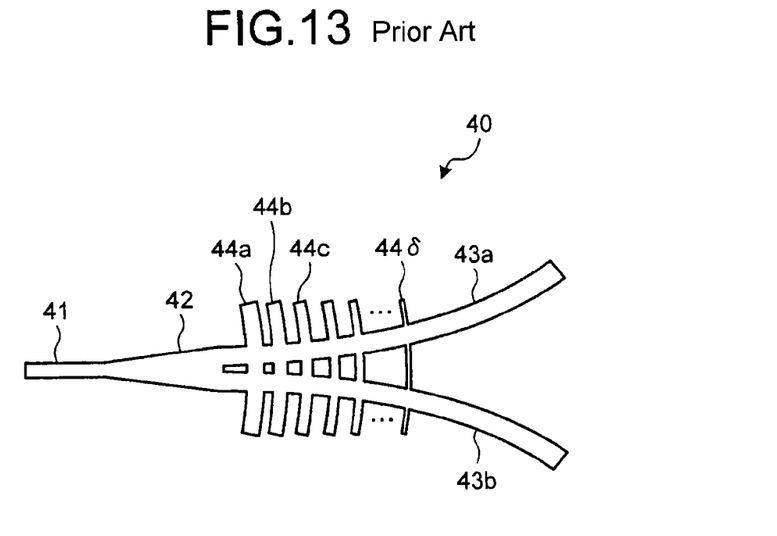
FIG. 13 is a schematic plan view of a conventional optical branching element.

A specific description will be made below. FIG. 13 is a schematic plan view of a conventional optical branching element. An optical branching element 40 illustrated in FIG. 13 has an input waveguide 41, a tapered waveguide 42 connected to the input waveguide 41, two branched waveguides 43a and 43b, and thirty strip-like waveguides 44a to 44δ. The optical branching element 40 largely differs from the optical branching element 10 in that the strip-like waveguides 44a to 44δ protrude outside each of the branched waveguides 43a and 43b.

When the strip-like waveguides 44a to 44δ protrude outside each of the branched waveguides 43a and 43b like this, ends of these protruding portions are not fixed and therefore, a waveguide pattern corresponding to the protruding portions may be deformed largely by falling against each other in the process for forming the upper cladding layer 12. This deformation deforms the lateral portions of the branched waveguides 43a and 43b as well, and therefore, the reduction in loss may not be achieved as designed by the waveguide pattern.

In an optical branching element using a slab waveguide as disclosed in Japanese Patent No. 3338356, Japanese Patent No. 4385224, and Japanese Patent Application Laid-open No. 2004-325865, the slab waveguide has a structure that does not confine light in a width direction, and therefore, a power distribution of light in the slab waveguide has a distribution profile in which the power is particularly high near the center in the width direction and low at the lateral portions. Therefore, even if the lateral portions of the branched waveguides near the slab waveguide are deformed by the protruding portions, an influence thereby on the optical loss is small.

However, in a Y-branched optical branching element, its tapered waveguide waveguides light by confining it in its width direction, and therefore, a power distribution of the light has a distribution profile in which power is also high at its lateral portions. Thus, if lateral portions of its branched waveguides near the tapered waveguide are deformed by its protruding portions, its optical loss is largely influenced.

In contrast, in the optical branching element 10 according to the first embodiment, the strip-like waveguides 4a to 4e are provided so as not to protrude outside the branched waveguides 3a and 3b. Thereby, each deformation as described above does not occur, and thus, a further reduction in the optical loss, which is closer to a designed value, is achieved.

As described above, the optical loss is further reduced in the optical branching element 10 according to the first embodiment.

First Modified Example

Figure 4:
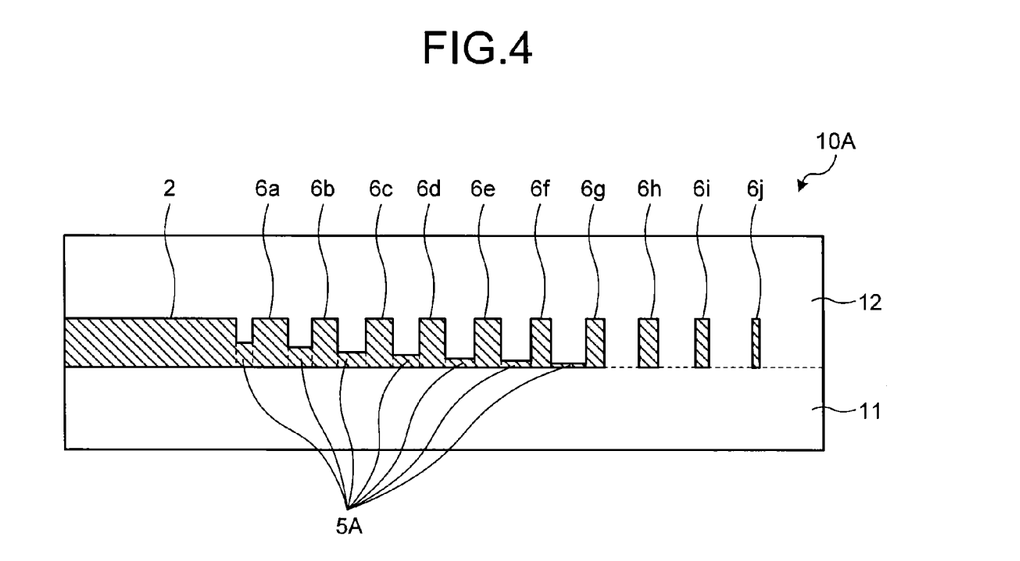
FIG. 4 is a schematic sectional view of an optical branching element according to a first modified example of the first embodiment.

Next, modified examples of the first embodiment will be described. FIG. 4 is a schematic sectional view of an optical branching element according to a first modified example of the first embodiment. An optical branching element 10A illustrated in FIG. 4 includes ten strip-like waveguides 6a to 6j and a buffer waveguide 5A, instead of the five strip-like waveguides 4a to 4e and the buffer waveguide 5, which are in the optical branching element 10 illustrated in FIG. 1.

The strip-like waveguides 6a to 6j are provided so as to connect between the branched waveguides 3a and 3b and so as not to protrude outside the branched waveguides 3a and 3b.

The buffer waveguide 5A is provided so as to fill in between the strip-like waveguides 6a to 6g, and is formed so as to descend in height as its distance from the tapered waveguide 2 ascends.

The tapered waveguide 2 is separated by, for example, a gap of 1.5 μm, from the strip-like waveguide 6a, which is the nearest to the tapered waveguide 2. Further, the strip-like waveguides 6a to 6j are provided so as to be separated from each other by a step of, for example, 22 μm, and in addition, are formed so as to descend in width as its distance from the tapered waveguide 2 ascends. For example, if a first width of the strip-like waveguide 6a is 14 μm, widths of the strip-like waveguides 6b, 6c, 6d, 6e, 6f, 6g, 6h, 6i, and 6j are approximately 12.5 μm, 11.0 μm, 9.5 μm, 8.0 μm, 6.5 μm, 5.0 μm, 3.5 μm, 2.0 μm, and 0.5 μm, respectively, and thus, they are formed such that their widths descend approximately linearly. A height of the strip-like waveguides 6a to 6j is 7 μm, and a height of the buffer waveguide 5A between the tapered waveguide 2 and the strip-like waveguide 6a is 3.5 μm, and therefore, a gap between the tapered waveguide 2 and the strip-like waveguide 6a has a depth of 3.5 μm. Depths of gaps are 4.2 μm, 5.0 μm, and 5.7 μm, 6.5 μm, 6.8 μm, and 6.9 μm between the strip-like waveguides 6a and 6b, between the strip-like waveguides 6b and 6c, between the strip-like waveguides 6c and 6d, between the strip-like waveguides 6d and 6e, between the strip-like waveguides 6e and 6f, and between the strip-like waveguides 6f and 6g, respectively.

The optical branching element 10A according to the first modified example also has even further reduced optical transmission loss because the strip-like waveguides 6a to 6j do not protrude outside the branched waveguides 3a and 3b.

Second Modified Example

Figure 5:
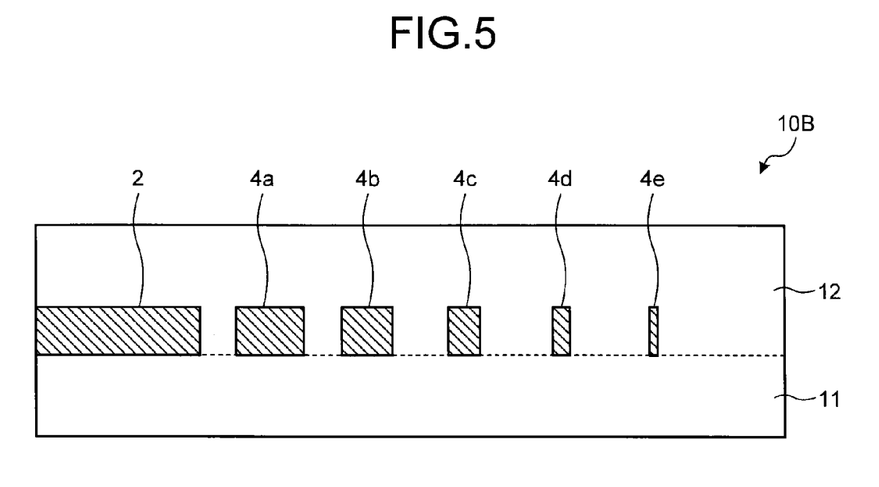
FIG. 5 is a schematic sectional view of an optical branching element according to a second modified example of the first embodiment.

FIG. 5 is a schematic sectional view of an optical branching element according to a second modified example of the first embodiment. An optical branching element 10B illustrated in FIG. 5 has a configuration in which the buffer waveguide 5 is omitted from the optical branching element 10 illustrated in FIG. 1.

The optical branching element 10B also has even further reduced optical transmission loss because the strip-like waveguides 4a to 4e do not protrude outside the branched waveguides 3a and 3b.

Second Embodiment

Figure 6:
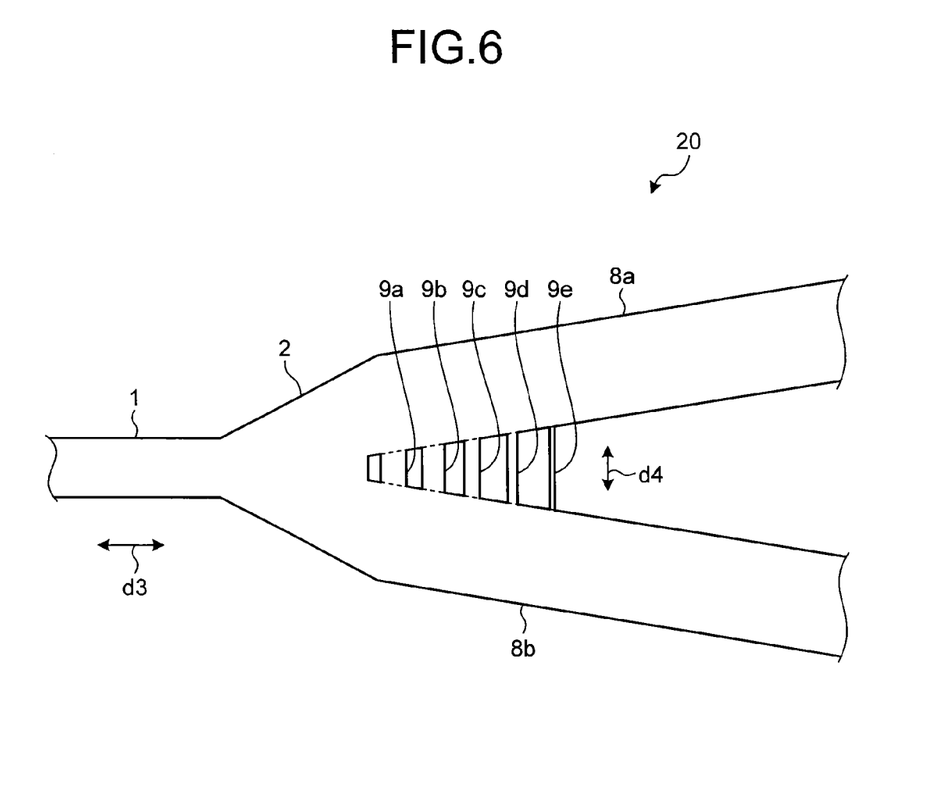
FIG. 6 is a schematic plan view of an optical branching element according to a second embodiment.

Next, a second embodiment of the present invention will be described. FIG. 6 is a schematic plan view of an optical branching element according to the second embodiment. As illustrated in FIG. 6, this optical branching element 20 includes two branched waveguides 8a and 8b and five strip-like waveguides 9a to 9e, instead of the two branched waveguides 3a and 3b and the five strip-like waveguides 4a to 4e, in the optical branching element 10 illustrated in FIG. 1.

The two branched waveguides 8a and 8b are connected to an optical output end of the tapered waveguide 2, and are composed of linear waveguides. The branched waveguides 8a and 8b are arranged so as to form a Y-shape with the input waveguide 1 and the tapered waveguide 2. Accordingly, the optical branching element 20 is configured as a Y-branched element. The branched waveguides 8a and 8b are also formed on a quartz substrate, and are formed so that their top portions and lateral portions are surrounded by an upper cladding layer. The branched waveguides 8a and 8b are made of silica-based glass that has an increased refractive index so that their relative refractive-index differences with respect to the quartz substrate and the upper cladding layer become 0.4%. Cross sections of the branched waveguides 8a and 8b each have a size of 7 μm×7 μm.

The strip-like waveguides 9a to 9e are composed of linear waveguides, and are provided so as to connect between the branched waveguides 8a and 8b and so as not to protrude outside the branched waveguides 8a and 8b. The strip-like waveguides 9a to 9e are also formed on the quartz substrate, formed such that their top portions and lateral portions are surrounded by the upper cladding layer, and are made of silica-based glass that has an increased refractive index so that their relative refractive-index differences with respect to the quartz substrate and the upper cladding layer become 0.4%.

Further, a gap between the tapered waveguide 2 and the strip-like waveguide 9a, which is the nearest to the tapered waveguide 2, steps between the strip-like waveguides 9a to 9e, and widths of the strip-like waveguides 9a to 9e are set similarly to those of the strip-like waveguides 4a to 4e.

Further, a propagation direction d3 of light in the input waveguide 1 is perpendicular to a longitudinal direction d4 of each of the strip-like waveguides 9a to 9e. Accordingly, loss due to intersections is able to be minimized, and an effect of increasing a coupling efficiency is maximized.

The optical branching element 20 also has even further reduced optical loss because the strip-like waveguides 9a to 9e do not protrude outside the branched waveguides 8a and 8b.

Next, preferable numbers of strip-like waveguides will be described. FIGS. 7 to 10 are diagrams illustrating, where the number of strip-like waveguides is 5, 10, 15, or 20, respectively, relations between steps of the strip-like waveguides and excess losses of the optical branching elements, when the first widths of the strip-like waveguides are varied. Shapes of the optical branching elements in FIGS. 7 to 10 are based on the shape of the optical branching element 10 according to the first embodiment and those of which the numbers of strip-like waveguides are varied to 10, 15, and 20. When the number of strip-like waveguides or the first width is changed, a width of the strip-like waveguide that is the farthest from the tapered waveguide is fixed to 0.5 μm, and a width of each of the strip-like waveguides is set so as to descend approximately linearly as becoming distant from the tapered waveguide. In these figures, N represents the number of the strip-like waveguides, and Ini_w in legends represents the first width of the strip-like waveguide.

Figure 7:
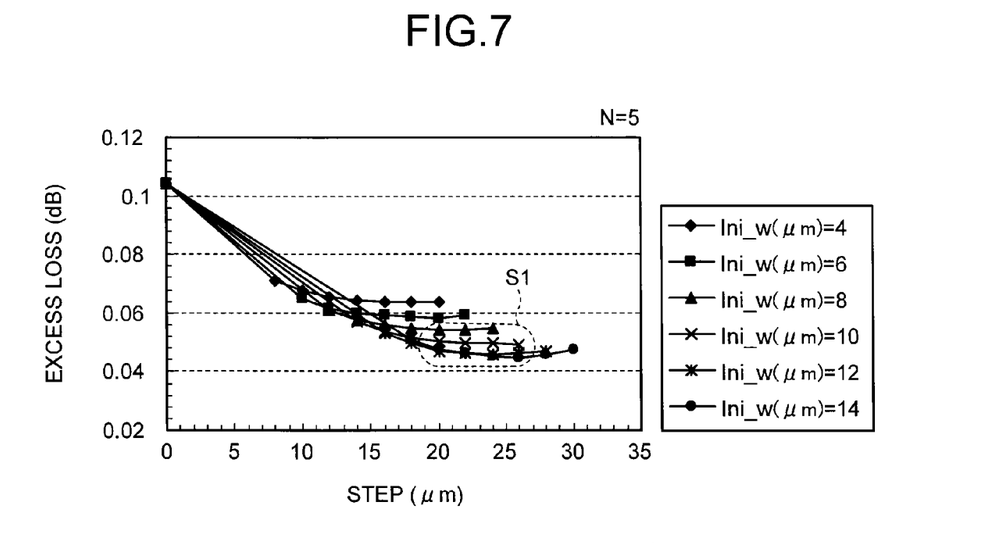
FIG. 7 is a diagram illustrating, where the number of strip-like waveguides is 5, relations between steps of the strip-like waveguides and excess losses of optical branching elements, when first widths of the strip-like waveguides are varied.
Figure 8:
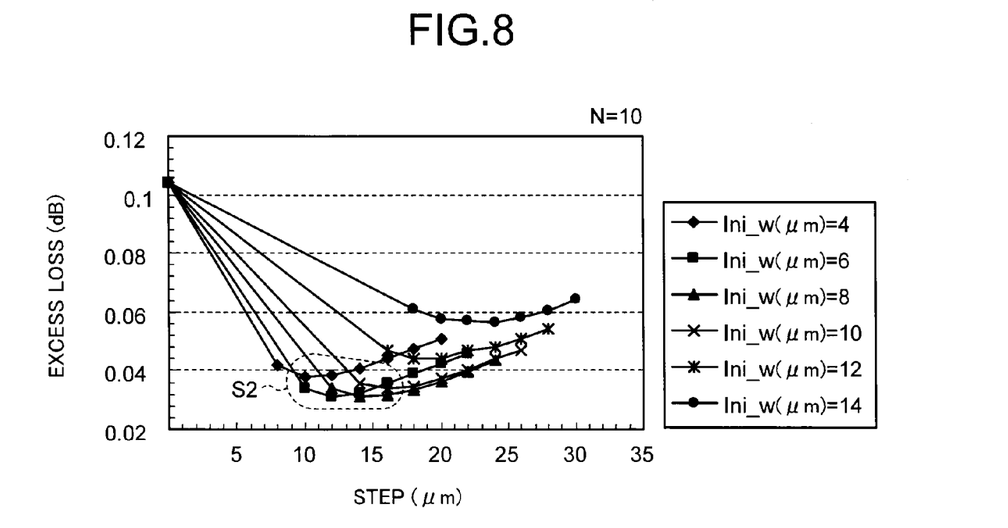
FIG. 8 is a diagram illustrating, where the number of strip-like waveguides is 10, relations between steps of the strip-like waveguides and excess losses of optical branching elements, when first widths of the strip-like waveguides are varied.

As illustrated in FIGS. 7 and 8, when N is 5 and 10, ranges of optimized regions S1 and S2, in which the excess losses are close to the minimum, are wide. Therefore, for example, their steps have a large tolerance against manufacturing errors and the like, and thus, these optical branching elements are suitable for mass production.

Figure 9:
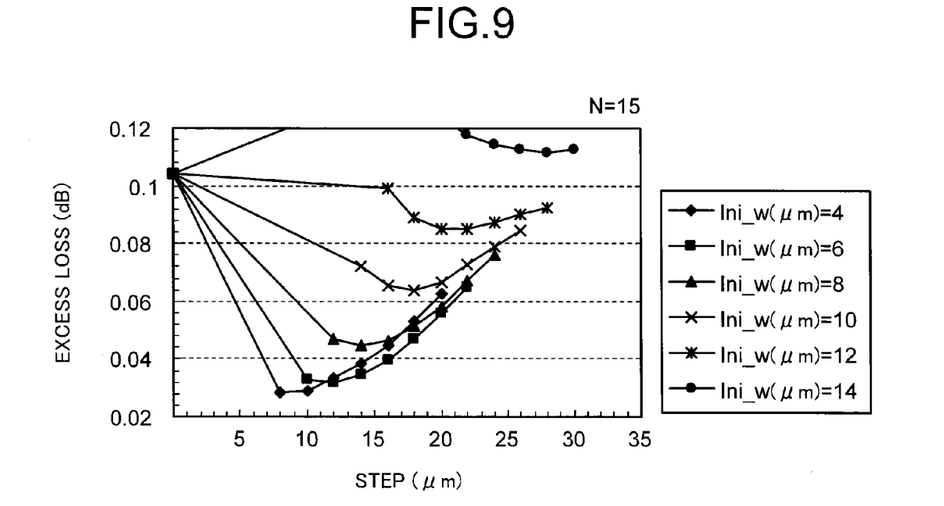
FIG. 9 is a diagram illustrating, where the number of strip-like waveguides is 15, relations between steps of the strip-like waveguides and excess losses of optical branching elements, when first widths of the strip-like waveguides are varied.
Figure 10:
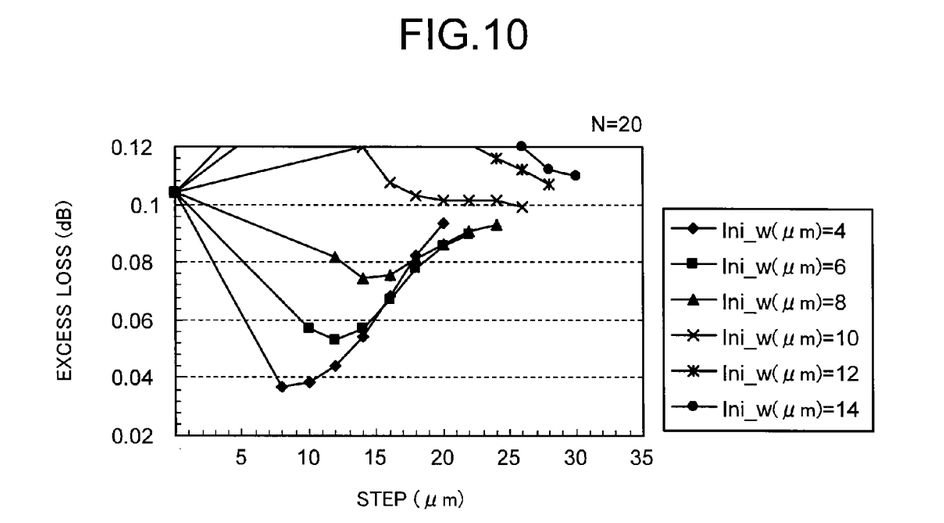
FIG. 10 is a diagram illustrating, where the number of strip-like waveguides is 20, relations between steps of the strip-like waveguides and excess losses of optical branching elements, when first widths of the strip-like waveguides are varied.

In contrast, as illustrated in FIGS. 9 and 10, when N is 15 and 20, optimized regions in which the excess losses are close to the minimum, are narrow, and therefore, their tolerance against errors and the like is small. Accordingly, the number of the strip-like waveguides is preferably 10 or less. Further, as to a lower limit of the number of the strip-like waveguides, if it is two or greater, an effect of increasing the coupling efficiency is achieved, and if five or greater, a larger effect of increasing the coupling efficiency is achieved, thus is more preferable.

Third Embodiment

Figure 11:
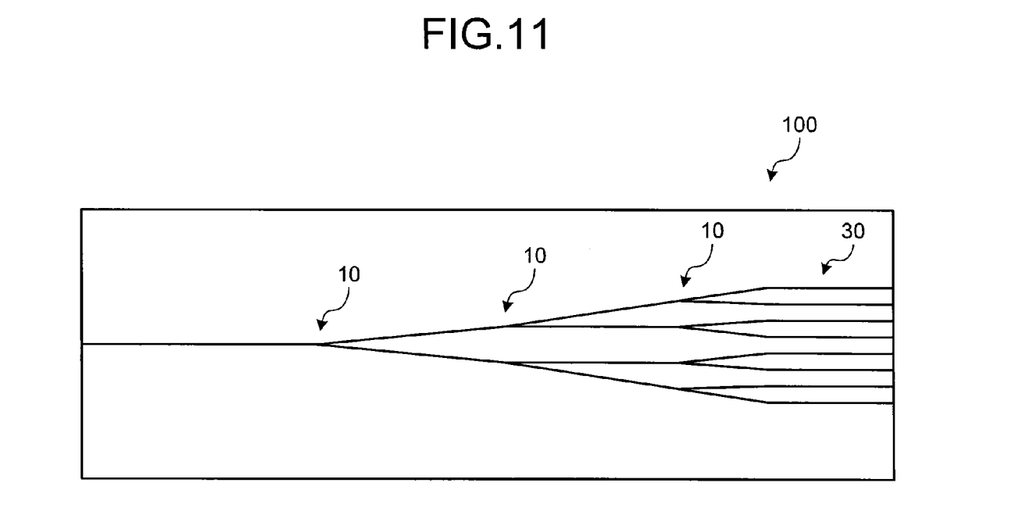
FIG. 11 is a schematic plan view of an optical branching circuit according to a third embodiment.

Next, an optical branching circuit according to a third embodiment of the present invention will be described. FIG. 11 is a schematic plan view of the optical branching circuit according to the third embodiment. As illustrated in FIG. 11, this optical branching circuit 100 is formed as a 1×8 optical branching circuit in which seven of the optical branching element 10 according to the first embodiment are cascade-connected in a tree form. An output waveguide 30 is connected to output ends of the four optical branching elements 10 at an 8-port end.

Because the optical branching circuit 100 includes the optical branching elements 10 according to the first embodiment, it is an optical branching circuit in which its optical loss is even further reduced.

Fourth Embodiment

Figure 12:
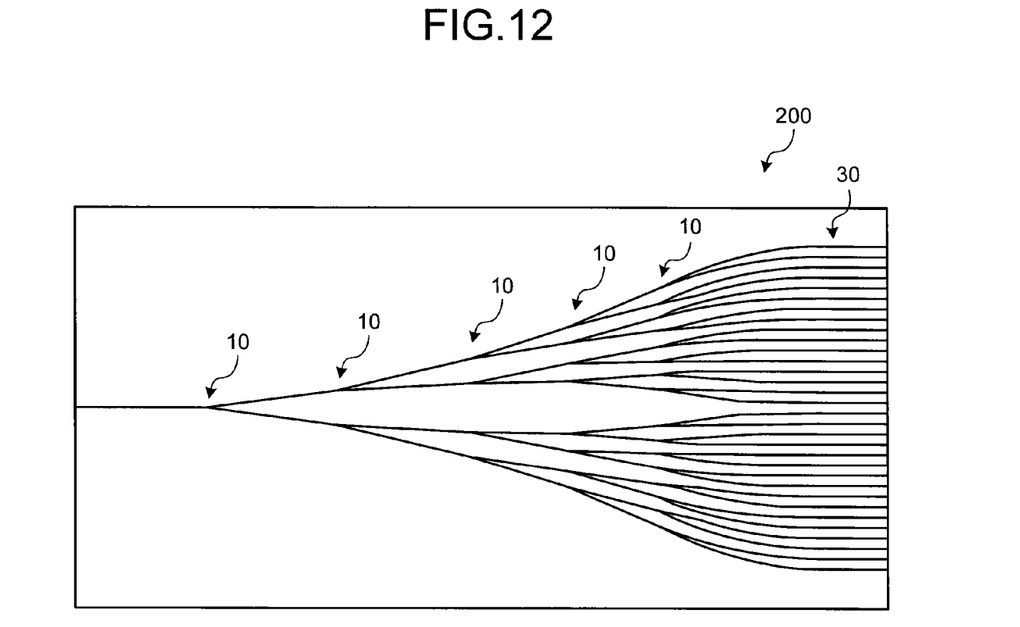
FIG. 12 is a schematic plan view of an optical branching circuit according to a fourth embodiment.

Next, an optical branching circuit according to a fourth embodiment of the present invention will be described. FIG. 12 is a schematic plan view of the optical branching circuit according to the fourth embodiment. As illustrated in FIG. 12, this optical branching circuit 200 is formed as a 1×32 optical branching circuit in which 31 of the optical branching element 10 according to the first embodiment are cascade-connected in a tree form. An output waveguide 30 is connected to output ends of the 16 optical branching elements 10 at a 32-port end.

This optical branching circuit 200 is also an optical branching circuit with even further reduced optical loss because it includes the optical branching elements 10 according to the first embodiment.

First Example and First Comparative Example

As a first example of the present invention, a 1×8 optical branching circuit, which uses the optical branching elements of the configuration illustrated in FIG. 1 and has the configuration illustrated in FIG. 11, was fabricated using the above-described PLC fabrication process. The first width of the strip-like waveguide was set to 14 μm; the step was set to 22 μm; the number was set to five; and the gap between the tapered waveguide and the strip-like waveguide was set to 1.5 μm. The characteristics of the waveguides were set to the values exemplified in the first embodiment. Specifically, for example, for the branched waveguides, the size of the cross sections was set to 7 μm×7 μm, and the relative refractive-index differences with respect to the quartz substrate and the upper cladding layer were set to 0.4%.

As a first comparative example, a 1×8 optical branching circuit, which uses the optical branching elements of the configuration illustrated in FIG. 13 and has the configuration illustrated in FIG. 11, was fabricated. The first width of the strip-like waveguide was set to 8 μm; the step was set to 20 μm; the number was set to 30; and the gap between the tapered waveguide and the strip-like waveguide was set to 1.5 μm. The width of the strip-like waveguide that was the farthest from the tapered waveguide was set to 0.5 μm, and the widths of the strip-like waveguides were set so as to descend approximately linearly as becoming distant from the tapered waveguide. The protruded lengths of the strip-like waveguides outside each of the branched waveguides were set to approximately 100 μm.

Average losses of insertion losses at the eight ports of the optical branching circuit of each of the first example and the first comparative example thus fabricated were measured at wavelengths of 1.31 μm and 1.55 μm. As a result, in the first comparative example, the average losses were 9.85 dB (at 1.31 μm) and 9.81 dB (at 1.55 μm). On the contrary, in the first example, the average losses were 9.64 dB (at 1.31 μm) and 9.63 dB (at 1.55 μm), which were lower losses than in the first comparative example.

Second Example

As a second example of the present invention, a 1×8 optical branching circuit, which uses the optical branching elements of the configuration illustrated in FIG. 4 and has the configuration illustrated in FIG. 11, was fabricated. The first width of the strip-like waveguide was set to 8 μm; the step was set to 14 μm; the number was set to 10; and the gap between the tapered waveguide and the strip-like waveguide was set to 1.5 μm. Further, the characteristics of the waveguides were set to the values exemplified in the first modified example.

Average losses of insertion losses at the eight ports of the optical branching circuit of the second example thus fabricated were measured at wavelengths of 1.31 μm and 1.55 μm. As a result, the average losses were 9.73 dB (at 1.31 μm) and 9.68 dB (at 1.55 μm), which were lower losses than in the first comparative example.

Third Example and Second Comparative Example

As a third example of the present invention, a 1×32 optical branching circuit, which uses the same optical branching elements as those of the first example and has the configuration illustrated in FIG. 12, was fabricated using the above-described PLC fabrication process.

As a second comparative example, a 1×32 optical branching circuit, which uses the same optical branching elements as those of the first comparative example and has the configuration illustrated in FIG. 12, was fabricated.

Average losses of insertion losses at the 32 ports of the optical branching circuit of each of the third example and the second comparative example thus fabricated were measured at wavelengths of 1.31 μm and 1.55 μm. As a result, in the second comparative example, the average losses were 16.46 dB (at 1.31 μm) and 16.39 dB (at 1.55 μm). On the contrary, in the third example, the average losses were 16.06 dB (at 1.31 μm) and 16.02 dB (at 1.55 μm), which were lower losses than in the second comparative example.

Fourth Example

As a fourth example of the present invention, a 1×8 optical branching circuit, which uses the optical branching elements having the configuration illustrated in FIG. 6, in which the branched waveguides are composed of linear waveguides, and which has the configuration illustrated in FIG. 11, was fabricated. The first width of the strip-like waveguide was set to 14 μm; the step was set to 22 μm; the number was set to five; and the gap between the tapered waveguide and the strip-like waveguide was set to 1.5 μm. Further, the characteristics of the waveguides were set to the values exemplified in the second embodiment.

Average losses of insertion losses at the eight ports of the optical branching circuit of the fourth example thus fabricated were measured at wavelengths of 1.31 μm and 1.55 μm. As a result, the average losses were 9.66 dB (at 1.31 μm) and 9.65 dB (at 1.55 μm), which were lower losses than in the first comparative example.

Fifth Example

As a fifth example of the present invention, a 1×8 optical branching circuit, which uses the optical branching elements of the configuration illustrated in FIG. 5 and has the configuration illustrated in FIG. 11, was fabricated. The first width of the strip-like waveguide was set to 14 μm; the step was set to 24 μm; the number was set to five; and the gap between the tapered waveguide and the strip-like waveguide was set to 1.5 μm. The characteristics of the waveguides were set to the values exemplified in the second modified example.

Average losses of insertion losses at the eight ports of the optical branching circuit of the fifth example thus fabricated were measured at wavelengths of 1.31 μm and 1.55 μm. As a result, the average losses were 9.70 dB (at 1.31 μm) and 9.65 dB (at 1.55 μm), which were lower losses than in the first comparative example.

According to an embodiment of the disclosure, there is an effect that an optical branching element and an optical branching circuit having even lower losses are achievable.

Although the optical branching elements and the optical branching circuits are made of silica-based glass in the embodiments and the examples described above, another glass material or organic material may be used as appropriate. Further, their fabrication method is not limited to the PLC process, and various fabrication methods may be used, by which optical branching elements and optical branching circuits composed of waveguides are able to be fabricated. Moreover, the sizes of the cross sections, the widths, and the numerical values of the characteristics, such as the relative refractive-index differences, of the waveguides mentioned in the embodiments and the examples described above have been illustrated as examples, and may be set as appropriate in correspondence with the constituent materials and desired characteristics of the optical branching elements and the optical branching circuits.

Furthermore, the present invention is not limited by the above-described embodiments. The present invention also includes configurations obtained by combining any of the above-described components as appropriate. For example, in the second embodiment, a buffer waveguide may be included like in the first embodiment. In addition, effects and modifications can be easily derived by those skilled in the art. Therefore, wider aspects of the present invention are not limited to the above-described embodiments, and various modifications are possible.

What is claimed is:

1. An optical branching element, comprising:
    an input waveguide;
    a tapered waveguide connected to the input waveguide;
    two branched waveguides that are connected to the tapered waveguide and arranged so as to form a Y-shape with the input waveguide and the tapered waveguide; and
    a plurality of strip-like waveguides that are provided so as to connect between the two branched waveguides and not to protrude outside the two branched waveguides, and formed so as to decrease in width as becoming distant from the tapered waveguide.

2. The optical branching element according to claim 1, wherein the plurality of strip-like waveguides are provided separated from each other by a predetermined interval.

3. The optical branching element according to claim 1, comprising ten or less of the strip-like waveguide.

4. The optical branching element according to claim 1, further comprising a buffer waveguide that is provided to fill in between the plurality of strip-like waveguides and formed to decrease in height as becoming distant from the tapered waveguide.

5. The optical branching element according to claim 1, wherein the tapered waveguide and the strip-like waveguides are separated from each other by a predetermined gap.

6. The optical branching element according to claim 1, wherein the two branched waveguides and the plurality of strip-like waveguides are composed of curved waveguides, and each of the branched waveguides is perpendicular to each of the strip-like waveguides.

7. The optical branching element according to claim 1, wherein the two branched waveguides and the plurality of strip-like waveguides are composed of linear waveguides, and a propagation direction of light in the input waveguide is perpendicular to each of the strip-like waveguides.

8. The optical branching element according to claim 1, wherein the optical branching element is formed on a quartz substrate.

9. An optical branching circuit, comprising:
   optical branching elements that are cascade-connected, each of which is according to claim 1.

* * * * *